United States Patent Office 3,567,323
Patented Mar. 2, 1971

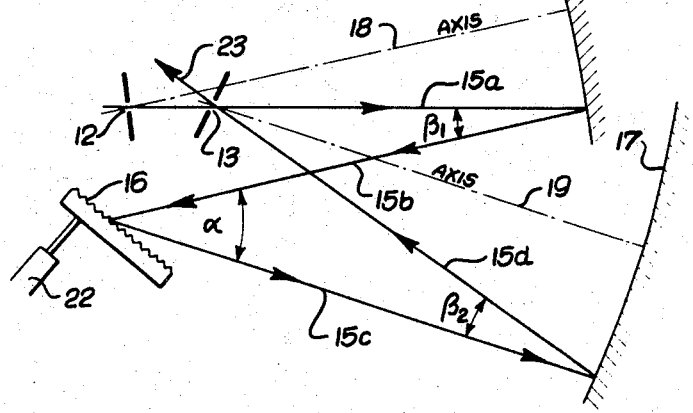
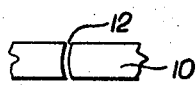
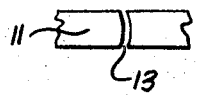
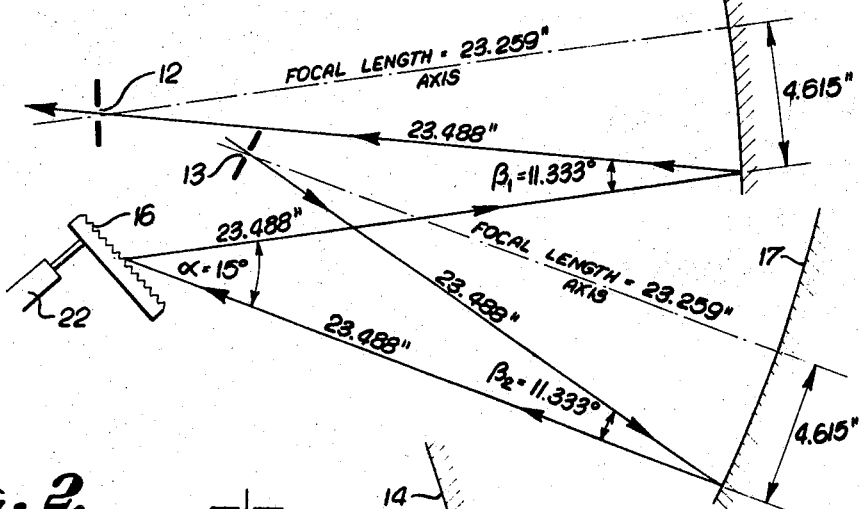
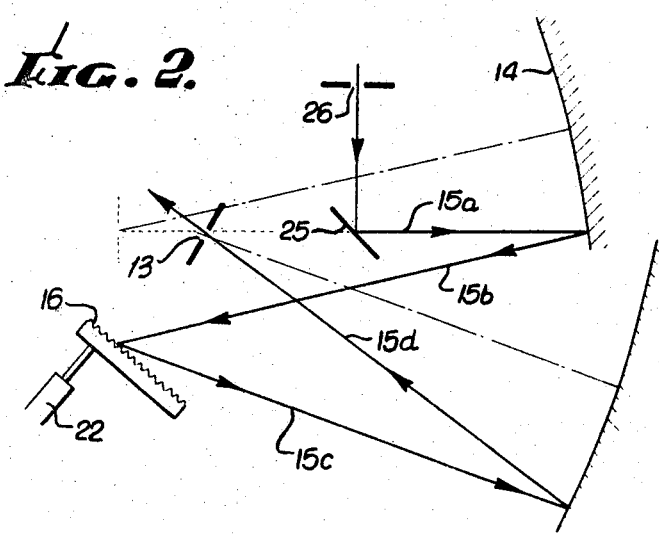

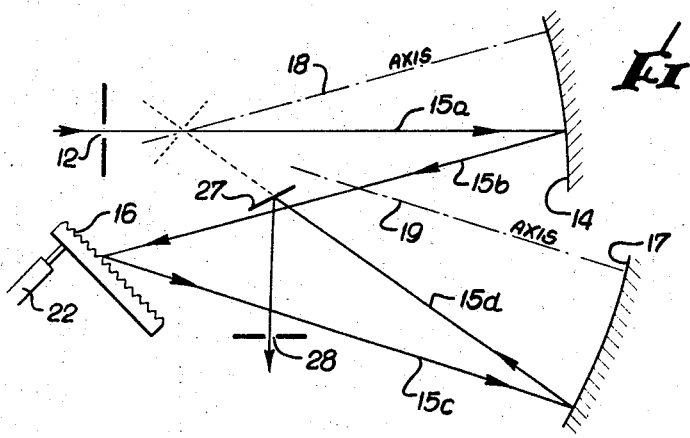
FIG.3.
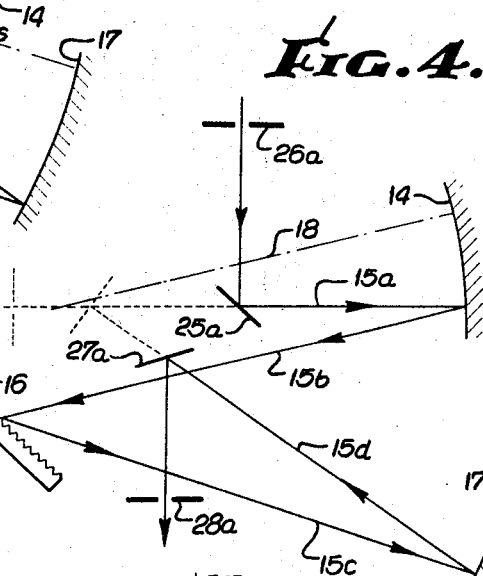
FIG.4.
FIG.5.
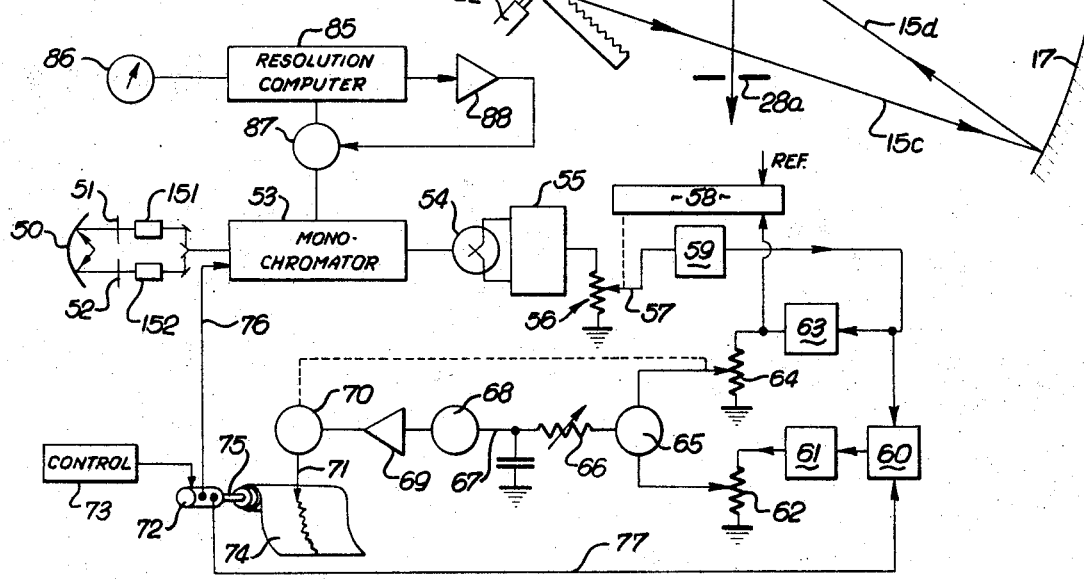
FIG.6.
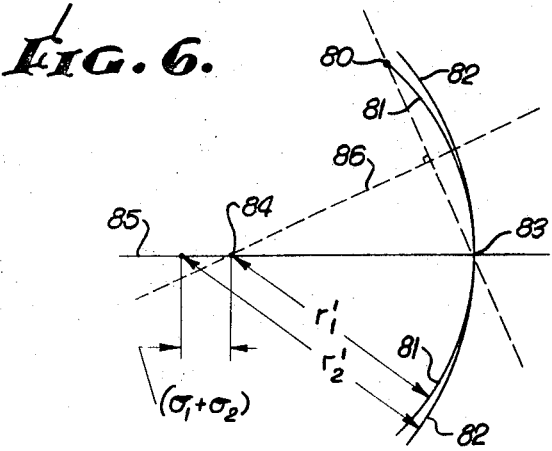
VERNON L. CHUPP
PAUL C. GRANTZ
INVENTORS.
BY White & Haefliger
ATTORNEYS.

3,567,323
HIGH SPECTRAL PURITY AND IMAGE QUALITY MONOCHROMATOR
Vernon L. Chupp, San Dimas, and Paul C. Grantz, Pomona, Calif., assignors to Cary Instruments, Monrovia, Calif.
Filed June 13, 1967, Ser. No. 645,746
Int. Cl. G01j 3/18, 3/42
U.S. Cl. 356—99                                    15 Claims

ABSTRACT OF THE DISCLOSURE

This is an improved asymmetric monochromator system, featuring coma cancellation, exceptional image quality, and invariance with wavelength of slit-image curvature. First and second paraboloidal mirrors having noncoincident axes are utilized; the reflections of the beam at the first and second mirrors are mutually asymmetric.

---

This invention relates generally to monochromators, and more particularly concerns advancements in spectral purity and image quality characteristics of monochromators.

Monochromators are devices for selecting, from a relatively broad spectrum of ultraviolet, visible or infrared light, a relatively narrow band of wavelengths of such light. Such a narrow waveband of light, i.e., is approximately "monocromatic" beam, is useful for various purposes, such as transmission to or reflection by a specimen, for determining the spectral transmission or reflection characteristics of the specimen. As is well known in the art, monochromators generally consist of a narrow "entrance" slit for defining a beam of broadband radiation, a lens or mirror for collimating the beam and directing it toward a dispersing element, a dispersing element for spreading the beam into a spectrum, and a lens or mirror (called the "telescope" or "secondary collimator") for receiving the dispersed radiation and focusing it in the plane (or, more rigorously, in a "focal surface" tangent to the plane) of a second ("exit") slit, which transmits only a relatively narrow part of the focused spectrum. The focused spectrum consists of an infinite array of overlapping monochromatic images of the entrance slit.

The present invention deals with monochromators of a type which employ mirrors as collimator and telescope, and which, like most monochromators, include mechanisms for adjusting the dipersing element relative to the slits and mirrors, to permit the central or nominal wavelength of the selected radiation waveband to be varied by the user.

Monochromators built according to the principles to be described herein may also, like most monochromators, include mechanisms for adjusting the width, but not the shape, of the slits, and other devices for performing various peripheral functions, though these are not essential to the invention and will not be discussed.

It will generally be understood that, as in most optical systems of this type, the direction of propagation of the radiation, along its path through the monochromator, may be reversed—in which case the functions of collimator and telescope are interchanged. Also, in subsequent discussion herein, the presence of flat, diagonal mirrors which may be inserted at various points of the optical path will generally be ignored, since such elements have no effect on the aberrations considered, but serve merely as deflecting devices.

Some of the advantageous features of the present invention are realizable in a monochromator employing a prism as dispersing element; however, the fullest advantage of the invention is in its application to a monochromator in which the dispersing element is a grating. Consequently, the discussion which follows is directed almost exclusively to "grating monochromators".

A large part of the design of monochromators constitutes an effort to reduce if not eliminate certain undesirable effects such as spherical aberration, coma, and poor spectral purity due to variation of slit image curvature with wavelength. For example, in the Czerny-Turner monochromator (slits at opposite sides of the grating) incorporating spherical collimator and telescope mirrors, spherical aberration of the mirrors deleteriously affects image-forming quality and hence spectral purity. Consequently, it appears preferable to employ off-axis parabolic mirrors, which do not suffer from this defect; however, for object points off the optical axis, the image quality deteriorates rapidly due to increased coma introduced by the parabolic mirrors. Thus, when parabolic collimator and telescope are employed in Czerny-Turner monchromators, the spectral purity is good for image points near the center of the slits, but poor for image points near the ends of the slits.

As another example of monochromator design, in the Littrow monochromator (slits at the same side of the grating) incorporating a single spherical mirror acting as both collimator and telescope, image quality is found to be poor due to spherical aberration. Also, inasmuch as the angle $\alpha$ between incident and diffracted beams at the grating is relatively small, it is not possible to achieve wavelength invariance of slit curvature in a system of desired high light gathering power. W. G. Fasties in an article, "Image Forming Properties of the Ebert Monochromator", J.O.S.A. 42, 9, September 1952, has observed that the imaging quality of a single-mirror Littrow system may be improved by substituting a parabolic collimator; however, whereas imaging may thereby be improved for object points both on and off the optical axis, the variation of slit-image curvature with wavelength cannot be eliminated at the same time.

It is a major object of the present invention to provide a monchromator in which the disadvantages associated with the above-described devices are substantially reduced or eliminated. An important result of the invention lies in improvement in the theoretical aberration-limited spectral resolution by a factor of at least 2.5 as compared with the best prior-art monochromators known to us.

Basically, the improved monochromator incorporates curved entrance and exit slits for passing electromagnetic radiation, a paraboloidal collimator mirror surface located to intercept a beam of radiation that passes through the entrance slit and to reflect the intercepted beam, a dispersing element such as a plane grating located for incidence thereon of the reflected beam and to diffract the latter, and a paraboloidal telescope mirror surface located to intercept the diffracted beam and to reflect the intercepted beam for travel toward the exit slit.

In accordance with the invention, the mirror surfaces and gratings are disposed so that the reflections of the beam at the collimator and at the telescope are mutually asymmetric (as will be fully defined below); the slits are typically at the same side of the bisector of the "grating angle" (i.e., the angle between the incident and diffracted beams at the grating); and the paraboloidal mirror surfaces are placed so that their axes do not coincide. As will be seen, this arrangement facilitates realization of coma cancellation and hence exceptional image quality in an asymmetric system without suffering the slit-image curvature variation with wavelength characteristic of the Littrow monochromator. Also, the angle $\alpha$ between the beam incident upon and that diffracted from the grating may then be increased (typically to values in excess of 10°) to realize sizable slit heights—very desirable in terms of energy transmission—while maintaining slit-curvature invariance with wavelength.

The word "asymmetric" as used throughout this specification and the appended claims, is intended to have a special meaning which is crucial to understanding and unambiguous definition of our invention. The condition, "Reflections at collimator and telescope are mutually asymmetric," here means that the deflection of the central ray of the beam at the collimator, and the deflection of the central ray at the telescope, are of opposite sense. The "sense" of the deflection, in turn, may be defined conveniently as follows. The central ray of the beam between the entrance slit and the collimator defines a line segment; the central ray of the beam between collimator and grating defines another line segment, intersecting the first at the mirror surface. By either clockwise or counter-clockwise rotation through an angle less than 180°, the incident-ray line segment may be made to lie along the reflected-ray line segment. The same is true of the line segments defined by the incident and reflected central ray at the telescope. At each mirror, the direction in which the incident-ray segment must be rotated to make it lie along the reflected-ray segment is the "sense" of the rotation. If the rotation required at the collimator is clockwise, then in an "asymmetric" system the rotation at the telescope must be counter-clockwise; if counter-clockwise at the collimator, then clockwise at the telescope. This definition of asymmetry is used for present purposes to distinguish against "symmetric" monochromators of the Czerny-Turner type; in "symmetric" monochromators, if the rotation is clockwise at the telescope it may be clockwise also at the collimator, and conversely. Monochromators of the Littrow type are asymmetric also, but such monochromators are generally made with a single mirror, and thus cannot be described as having two paraboloidal mirror surfaces with non-coincident axes.

Another equivalent way of viewing the distinction, with respect to the Czerny-Turner monochromator, is to note that in our device (in the absence of plane deflecting or "folding" mirrors) the entrance and exit slits are on the same side of the line which bisects the grating angle (defined above).

Some properties of a grating monochromator (in particular the aberration contributions introduced by the curved mirrors) may be analyzed by envisioning an analogous system in which a flat mirror is substituted for the grating. In such a simplified system, iwth the above-described arrangement of paraboloids, coma cancellation is nearly optimum if the focal length and off-axis angle of the collimator mirror are made approximately equal to those of the telescope mirror. Since the grating introduces an asymmetric comatic-type aberration of its own, a more perfect cancellation at some wavelength occurs when one uses paraboloids with unequal focal lengths, or unequal off-axis angles, or both by an appropriate ratio, to compensate for the grating aberration. However, extremely good coma cancellation and hence image quality result, in the above configuration, with identical parabolic sections, even with the diffraction grating in the beam. (Furthermore, the grating effect is greatest at large grating angles, in which case the dispersion is such that the increased aberration has least effect on the spectrometer resolution.) As in most monochromators, the entrance slit is typically located approximately at the focus of the collimator mirror surface, and the exit slit is typically located at the focus of the telescope mirror surface.

These and other objects and advantages of the invention, as well as the details of illustrative embodiments, will be fully understood from the following detailed description of the drawings, in which:

FIG. 1 is an optical layout of a monochromator incorporating the invention, as viewed "from above";

FIGS. 1b and 1c are end views of the entrance and exit slits incorporated in the FIG. 1 monochromator;

FIG. 1d is a specific embodiment of the FIG. 1 layout;

FIG. 2 is an optical layout of a modified monochromator;

FIG. 3 is an optical layout of another modified monochromator;

FIG. 4 is an optical layout of yet another modified monochromator;

FIG. 5 is a block diagram of a spectrophotometer in which the invention is incorporated; and FIG. 6 is a diagram representing a geometrical construction process useful in designing monochromators according to the principles of our invention.

Referring first to FIGS. 1, 1b and 1c, structure 10 and 11 defines entrance and exit slits 12 and 13 for passing electromagnetic radiation such as visible light. A parabolic collimator mirror surface 14 is located to intercept a beam 15a of radiation that passes the entrance slit and to reflect the intercepted beam to travel at 15b toward the dispersing element. The latter may take the form of the plane grating 16 illustrated, which is located to diffract the incident beam at 15c. A parabolic telescope mirror surface 17 is located to intercept the diffracted beam and to reflect the intercepted beam for travel at 15d toward the exit slit. In this regard, the mirrors may have axes 18 and 19 as indicated, and may typically constitute paraboloids of revolution about such axes. Note also that the slits 12 and 13 are oppositely curved when viewed from the left, as is clear from FIGS. 1, 1b and 1c.

In accordance with the invention, the paraboloidal mirror surfaces and the grating are disposed so that (1) the reflection of the beam 15a (FIG. 1), at first surface 14, is asymmetric with respect to the reflection of the beam 15d at second surface 17 (angle $\beta_1>0$, but angle $\beta_2<0$, as conventionally measured, where each of $\beta_1$ and $\beta_2$ is an angle less than 180° through which an incident-ray line segment must be rotated to lie along the corresponding reflected-ray line segment), and further so that (2) the mirror surfaces have non-coincident axes 18 and 19. Note also that the beam 15b as reflected from the collimator surface 14 is substantially parallel to but spaced from the axis 18, and the beam 15c as intercepted by surface 17 is substantially parallel to but spaced from the axis 19. Further, the slits 12 and 13 in the "unfolded" version of the monochromator (FIG. 1) are at the same side of the grating 16.

In addition, the angle α (between incident and diffracted beams at the grating) is large enough to permit fabricating the slits (1) with substantial height, to attain high light-gathering power, and (2) in the shape required for slit-image-curvature invariance with wave-length—i.e., in the completed monochromator, any one of the monochromatic images of the entrance slit 12 may be made to coincide substantially with the exit slit 13, merely by rotating the grating 16, although the physical curvatures of the slits remain constant. In this regard, the grating 16 may, as is conventional, be rotated about an axis located approximately in the "face" of the grating, and normal to the plane of FIG. 1, as by an actuator or drive 22, to control the wavelength of radiation transmitted at 23. Finally, it will be noted in FIG. 1 that the entrance slit 12 is at the focus of the paraboloid defined by surface 14 and the exit slit 13 is at the focus of the paraboloid defined by the surface 17.

In a specific embodiment, the system of FIG. 1 may have the dimensions shown in FIG. 1d, the direction of light travel being shown as reversed relative to that of FIG. 2; however, it will be noted that light may travel in either direction. Note here that $\beta_1<0$, and $\beta_2>0$. Such a system, for grating dimensions of 65 by 76 mm., is capable of scanning the entire wavelength region from 2.5 to 50μ, using four first-order gratings. The first grating has 300 rulings per millimeter and is blazed for 3.5μ; the second grating has 120 lines per millimeter and is blazed for 7.5μ; the third grating has 60 lines per mm. and is blazed for 16μ; and the fourth grating has 30 lines per mm. and is blazed for 30μ. For the system illustrated, the minimum horizontal f/number is 8.0 (with the second grating, at 5.25μ, and the maximum horizontal f/number is 11.2 (first grating, 5.25μ), while the corresponding quantities for the incident half of the system are 8.74 and 15.8.

(In this regard f/number is defined by the ratio of (1) the effective focal length of the focusing element of an optical system and (2) the diameter of the limiting aperture of the system. The "effective focal length" in this context is defined as the distance from the focal point to the surface as measured along the chief or central ray. As the aperture of the system may not be circular or square, the "diameter of the limiting aperture" may be different in different directions. Therefore, the horizontal f/number is the effective focal length of the focusing element of the system divided by the projected dimension of the limiting aperture in the horizontal direction.)

The radius of curvature for the optimum slit in monochromators of the type under discussion is an increasing function of the angle $\alpha$ between incident and diffracted beams at the grating; if this angle is too small, the required radius of the slits is very small and the result may be that the total permissible length of each of the two slits will be too short to permit adequate light gathering power by the monochromator. It is for this reason desirable to maintain relatively large angles.

FIG. 2 illustrates another form of the monochromator of the invention, like that of FIG. 1 excepting that it is "folded." A flat mirror 25 is located to deviate the direction of travel of the beam passing from the entrance slit 26 to surface 14, for convenience in arrangement of the components and associated equipment. The other elements of the monochromator bear the same numerals as in FIG. 1.

FIG. 3 shows still another folded form of the monochromator of the invention. A flat mirror 27 is located to deviate the direction of travel of the beam or chief ray passing from surface 17 to the exit slit 28. The other elements of the FIG. 3 monochromator bear the same numerals as in FIG. 1.

Finally, the FIG. 4 folded device uses a combination of flat mirrors 25a and 27a respectively corresponding to flat mirror 25 in FIG. 2 and flat mirror 27 in FIG. 3, other elements remaining as in FIG. 1.

A highly desirable condition of slit image curvature invariance with wavelength may be realized by dimensioning the radii of curvature $r_1$ and $r_2$ of the entrance and exit slits in accordance with the following mathematical expressions:

$$r_1 = f_1 \tan(\alpha/2) + \sigma_1 \quad (1)$$
$$r_2 = f_2 \tan(\alpha/2) + \sigma_2 \quad (2)$$

where $f_1$ is the effective focal length of the paraboloid defined by surface 14; $f_2$ is the effective focal length of the paraboloid defined by the surface 17; $\alpha$ is the angle at the grating between incident and diffracted beams; and $\sigma_1$ and $\sigma_2$ are constants which represent corrections for image distortion effects arriving at the parabolas, and which in most systems will be less than 5% of $r_1$ and $r_2$ respectively. (The first term on the right side of each equation above is based on computations presented by C. S. Rupert in J.O.S.A. 42, 9, page 780.)

For this asymmetric system the $\sigma_1$ and $\sigma_2$ distortions are additive, and under some circumstances may be sufficiently perceptible as not to be ignored.

In determining the values of the additive corrections $\sigma_1$ and $\sigma_2$, one method involves ray-tracing as follows: First, consider the radius of the entrance slit to be defined by Equation 1 with $\sigma_1$ equal to zero. Trace through the system the single ray which passes through one end of the entrance slit, parallel to the central ray of the system. Note the point, such as 80 in FIG. 6, in the exit slit plane through which this ray passes. It then becomes possible to determine, geometrically, the radius of curvature $r_1'$ of the image of the entrance slit in the exit slit plane, assuming that the point 80 lies on a circle 81 which is tangent to the assumed exit slit 82 at the slit mid-point 83, and also assuming that the center 84 of the circle 81 lies on a line 85 perpendicular to the tangent to the exit slit 82 at the slit mid-point 83. Thus, the center 84 is at the intersection of line 85 with a line 86 perpendicularly bisecting a line drawn between points 80 and 83. The radius $r_1'$ of the circle 81 found in this way may then be subtracted from the radius $r_2'$ of the exit slit as found from Equation 2 with $\sigma_2$ equal to zero. The difference $r_2' - r_1'$ is equal to $\sigma_1 + \sigma_2$, as illustrated in FIG. 6. In most instances, the correction is so small that it may be applied to the exit slit only. In one example, $\sigma_2 = 2\%$ of $r_2$, in an f/8 system, and in practice $\sigma_1 < 5\%$ $r_1$ and $\sigma_2 < 5\%$ $r_2$. In the event $f_1 = f_2$, then $\sigma_1 = \sigma_2$. The corrected radii may then be found as:

$$r_1 = r_1' + \sigma_1$$
$$r_2 = r_2' - \sigma_2$$

or as:

$$r_1 = r_1'$$
$$r_2 = r_2' - (\sigma_1 + \sigma_2)$$

The coma cancellation described above can be realized in prism monochromators constructed according to our invention; however, because of the varying refractive index of the prism, the invariance of slit-image curvature will not be realizable. Thus, as outlined earlier, this invention is applicable to and useful in prism monochromators, though not to fullest advantage.

In designing a grating monochromator, the designer first selects a grating. He decides on the character of the rulings (also called lines, grooves, etc.) to determine the dispersive characteristics of the grating, and thus the basic dispersive characteristics of the instrument. He also chooses $d_{APERTURE}$, the dimension of the grating aperture in the direction paralleling the rulings, as the first step in determining the light-gathering power of the system. Light-gathering power, also called "light grasp," is measured by the Clausius constant $$K = \frac{A_1 \cdot A_2}{L^2} \quad (3)$$

where the A's are the areas of the two limiting apertures (here, grating aperture and slit) in a system, and L is the effective distance between them—i.e., the distance between their images in some common optical "space." Higher light grasp results in (1) for a given source and slitwidth, higher light flux in the detector and therefore better signal-to-noise ratio; or (2) for a given source and signal-to-noise ratio, narrower slits and hence better spectral resolution—isolation of a narrower optical waveband.

The next parameter chosen may be the f/number; this choice, in combination with the grating aperture, determines (by definition of the parameter f/number) the effective focal lengths f of the collimators:

$$f = (\text{"}f/\text{number"}) \times (d_{APERTURE}) \quad (4)$$

The next choice is that of the slit-height-to-focal-length ratio, and thus the slit height—i.e., dimension parallel to the grating rulings. It is generally known in the art of monochromator design that, other things being equal, large values of slit height are equivalent to high light-gathering power. However, large values of the slit-height-to-focal-length ratio result in light rays which make large angles with the optical axis of the system, i.e. with the central ray. The larger the angles, the worse the imaging properties attainable in practice, and the worse the overall resolution of the monochromator. In one embodiment of the present invention, the slit-height-to-focal-length ratio $H/f$ is $1/20$; this is at present considered to be a practical upper limit, for the reason outlined above. Reasonable values of $H/f$ lie between $1/20$ and $1/40$. In this regard, larger slit heights can now be realized in an asymmetric system, in accordance with the invention.

The (adjustable) slit dimension perpendicular to the grating rulings, i.e., the slit width $w$, is determined by the required resolution, according to the relationship:

$$w = \frac{fm\Delta\lambda}{s \cos(e)}$$

where $f$ = focal length of telescope;
$m$ = spectral order;
$\Delta\lambda$ = spectral bandwidth desired;
$s$ = distance between grating rulings;
$e$ = angle between the central diffracted ray from the grating and the grating normal.

The entrance and exit slits usually have the same (simultaneously adjustable) width, but may be different, and in proportion to the two focal lengths, if the latter are unequal. Note that $w$ is adjustable by the operator of the completed instrument. It is a design parameter only in the sense that the designer decides what values of $\Delta\lambda$ will be attainable for practical values of $w$ (i.e., not too wide or narrow), and decides what physical range of $w$s will be available in the equipment.

One highly useful application of the monochromator described above is in an infrared ratio-recording spectrophotometer as seen in FIG. 5, which may for example operate over the wavelength range 2.5–22.2$\mu$. As there indicated, radiation from the light source 50 is split and passes through the chopper discs 51 and 52 which respectively pulse the sample beam component at 13⅓ c.p.s., and the reference beam component at 26⅔ c.p.s. The respective beams are then passed through sample and reference compartments 151 and 152, after which they are recombined and pass through the monochromator 53 (which includes the above-described monochromator apparatus) to the thermocouple detector 54 where they are converted to electronic signals. After preamplification at 55, the signal is adjusted by the automatic-gain-control potentiometer 56 to provide a constant reference-signal level. In this regard, the potentiometer wiper 57 is driven by the automatic gain control indicated at 58. The signal is then further amplified and any noise is removed by filtering, at 59.

The 13⅓ c.p.s. sample component may be controlled by the balance multipots 60 and filtered at 61 for application to the slidewire 62 to set the baseline. The 26⅔ c.p.s. reference component, filtered at 63, is electrically attenuated by the pen slidewire 64 until it is equal in magnitude to the sample signal. Any difference between the two signals, resulting from slidewire unbalance, is demodulated at 65 and filtered by variable-period filter 66. The error signal 67 is then modulated to 60 c.p.s. AC at 68, amplified at 69 and used to drive the motor 70 driving recorder pen 71.

A single motor 72, controlled at 73 over a wide speed range, is used to drive the chart 74 and also the monochromator scan mechanism (grating position), such connections being indicated at 75 and 76. The motor 72 also controls the multipots by connection 77.

An analog computer 85 calculates the true spectral slit width and registers this on the slit meter 86. It also controls the slit motor 87 via amplifier 88 to maintain constant resolution if required.

We claim.

1. In a monochromator,
   structure defining curved entrance and exit slits for passing electromagnetic radiation;
   a paraboloidal collimator mirror surface located to intercept a beam of said radiation that passes through the entrance slit and to reflect the intercepted beam;
   an element located for incidence thereon of the reflected beam and to disperse the incident beam;
   a paraboloidal telescope mirror surface located to intercept the dispersed beam and to reflect the intercepted beam for travel toward the exit slit;
   the mirror surfaces and dispersing element being disposed so that the reflections of the beam at the collimator and telescope surfaces are mutually asymmetric, and further disposed so that the paraboloidal surfaces have substantially non-coincident axes.

2. The monochromator of claim 1 wherein the slits, surfaces and dispersing element are located so that
   the beam reflected from the collimator mirror surface is substantially parallel to but spaced from the axis of the paraboloid defined by said collimator mirror surface; and
   the beam intercepted by the telescope mirror surface is substantially parallel to but spaced from the axis of the paraboloid defined by said telescope mirror surface.

3. The monochromator of claim 1, in which
   the entrance slit is approximately at the focus of the paraboloid defined by said collimator mirror surface; and
   the exit slit is approximately at the focus of the paraboloid defined by said telescope mirror surface.

4. The monochromator of claim 1, including a flat mirror located to deviate the direction of travel of the beam passing from the entrance slit to said collimator surface.

5. The monochromator of claim 1 including a flat mirror located to deviate the direction of travel of the beam passing from said telescope surface toward said exit slit.

6. The monochromator of claim 1, wherein said dispersing element comprises a plane grating.

7. The monochromator of claim 6, wherein the image of the entrance slit substantially coincides with the exit slit for different wavelengths of said radiation.

8. The monochromator of claim 6, wherein the angle $\alpha$ defined by the beams incident upon and diffracted by the grating is larger than 10°.

9. The monochromator of claim 7, in which said entrance and exit slits have curvatures that remain constant for said different wavelengths.

10. The monochromator of claim 6, in which said entrance and exit slits have radii of curvature $r_1$ and $r_2$ respectively, the parabola defined by said collimator surface has focal length $f_1$, the parabola defined by said telescope surface has focal length $f_2$, and wherein $$r_1 = f_1 \tan(\alpha/2) + \sigma_1$$

and $$r_2 = f_2 \tan(\alpha/2) + \sigma_2$$

where $\sigma_1$ and $\sigma_2$ are constants whose magnitude is small relaitve to $r_1$ and $r_2$ respectively and where $\alpha$ is the angle at the grating between the incident and the dispersed beams.

11. In spectrophotometer structure operable to produce an output signal having a value corresponding to the ratio of sample and reference radiation beams, the monochromator of claim 1.

12. A monochromator, comprising:
   a light source:
   structure defining a curved entrance slit for receiving light from said source and transmitting a diverging beam of such light;
   a first paraboloidal mirror disposed to intercept said diverging beam, and form by reflection thereof a collimated beam;
   a dispersing element disposed to receive said collimated beam, for producing therefrom a spectrally dispersed beam; said collimated and dispersed beams having substantially central rays which define an angle;
   a second paraboloidal mirror disposed, with its axis displaced from the axis of said first mirror, to intercept the dispersed beam and to produce by reflection thereof a focused spectrum; and
   an exit slit located substantially in the focal surface of said spectrum, for transmitting only a relatively narrow portion of said spectrum, said exit slit being on the same side of a line bisecting said angle as is said entrance slit.

13. A monochromator comprising
a light source;
structure defining a curved entrance slit for receiving light from said source and transmitting a diverging beam of such light;
a first paraboloidal mirror disposed to intercept said diverging beam, and form by reflection thereof a collimated beam;
a dispersing element disposed to receive said collimated beam, for producing therefrom a spectrally dispersed beam; said collimated and dispersed beams having subtantially central rays which define an angle;
a second paraboloidal mirror disposed, with its axis displaced from the axis of said first mirror, to intercept the dispersed beam and to produce by reflection thereof a focused spectrum beam; and
structure defining a curved exit slit located substantially in the focal surface of said spectrum, for transmitting only a relatively narrow portion of said spectrum; and
folding mirror means, including a plane reflector to deflect a light beam without affecting the focal condition of said beam, such folding mirror means being located to deviate the direction of travel of light passing between one of said slits and the one of said paraboloidal mirrors closest to said one slit along the optical path, for convenience in arrangement of the above-enumerated elements;
such folding mirror means producing a virtual image of said one slit as seen from the position of said one closest paraboloidal mirror; and
said virtual image being on the same side of a line bisecting said angle as is the other slit.

14. A grating monochromator comprising;
a collimator reflector surface formed by a section of, and defining in space, a paraboloid of revolution;
a grating;
a telescope parabolic reflector surface substantially non-coincident with said paraboloid;
entrance and exit slits; and
means to establish a light beam passing through said entrance slit, undergoing at said collimator surface a first reflection, undergoing at said grating a second reflection, undergoing at said telescope surface a subsequent reflection asymmetric with respect to said first reflection, and passing through said exit slit;
whereby coma introduced by said beam in said first reflection is substantially cancelled in said subsequent reflection.

15. A monochromator comprising,
a light source;
structure defining a curved entrance slit for receiving light from said source and transmitting a diverging beam of such light;
a first paraboloidal mirror disposed to intercept said diverging beam, and form by reflection thereof a collimated beam;
a dispersing element disposed to receive said collimated beam, for producing therefrom a spectrally dispersed beam; said collimated and dispersed beams having substantially central rays which define an angle;
a second paraboloidal mirror disposed, with its axis displaced from the axis of said first mirror, to intercept the dispersed beam and to produce by reflection thereof a focused spectrum beam; and
structure defining a curved exit slit located substantially in the focal surface of said spectrum, for transmitting only a relatively narrow portion of said spectrum; and
folding mirror means, including a first and a second plane reflector to deflect a light beam without affecting the focal condition of said beam,
said first reflector being located to deviate the direction of travel of light passing from said entrance slit to said first paraboloidal mirror, and said second reflector being located to deviate the direction of travel of light passing from said second paraboloidal mirror to said exit slit, for convenience in arrangement of the above-enumerated elements;
said first reflector forming a virtual image of said entrance slit as seen from the position of said first paraboloidal mirror and said second reflector forming a virtual image of said exit slit as seen from the position of said second paraboloidal mirror; and
said virtual images being on the same side of a line bisecting said angle.

References Cited

UNITED STATES PATENTS 2,922,331    1/1960    Fastie et al. _____ 356—99

OTHER REFERENCES

McCubbin et al.: "A High-Resolution Grating-Prism Spectrometer for the Infrared," Applied Optics, vol. 1, no. 4, July 1962, pp. 431–436.

Evans et al.: "Conversion of a Double-Beam Infrared Spectrometer to Grating Operation," Applied Optics, vol. 3, no. 3, March 1964, pp. 357–360.

RONALD L. WIBERT, Primary Examiner

F. L. EVANS, Assistant Examiner

U.S. Cl. X.R.

356—95, 97